Feb. 26, 1963 H. F. OLSON ETAL 3,078,752

CIRCUIT FOR SIMULATING VIBRATO EFFECT BY AMPLITUDE MODULATION OF TONE BY SAWTOOTH WAVEFORM

Original Filed Dec. 26, 1951 3 Sheets-Sheet 1

INVENTORS
HARRY F. OLSON AND
HERBERT BELAR
BY Morris Rabkin
ATTORNEY

INVENTORS
HARRY F. OLSON AND
HERBERT BELAR
BY Morris Kahn
ATTORNEY

Feb. 26, 1963 H. F. OLSON ET AL 3,078,752

CIRCUIT FOR SIMULATING VIBRATO EFFECT BY AMPLITUDE MODULATION OF TONE BY SAWTOOTH WAVEFORM

Original Filed Dec. 26, 1951 3 Sheets-Sheet 3

INVENTORS
HARRY F. OLSON AND
HERBERT BELAR
BY [signature]
ATTORNEY

United States Patent Office 3,078,752

Patented Feb. 26, 1963

3,078,752

CIRCUIT FOR SIMULATING VIBRATO EFFECT BY AMPLITUDE MODULATION OF TONE BY SAW-TOOTH WAVEFORM

Harry F. Olson, Princeton, and Herbert Belar, Palmyra, N.J., assignors to Radio Corporation of America, a corporation of Delaware Original application Dec. 26, 1951, Ser. No. 263,252, now Patent No. 2,855,816, dated Oct. 14, 1958. Divided and this application Feb. 27, 1958, Ser. No. 717,858

6 Claims. (Cl. 84—1.25)

This application is a division of our copending application Serial No. 263,252, filed December 26, 1951 for Music Synthesizer, now Patent No. 2,855,816, issued October 14, 1958.

The present invention relates to apparatus for producing tonal effects and more particularly to apparatus for controlling changes in characteristics of a tone, such as may be produced in a music synthesizer device.

Apparatus incorporating the present invention will be especially useful in providing tonal effects involving the auditory sensation of pitch. The pitch or frequency glide effect known as portamento for changing from one produced tone to another may be accomplished with apparatus embodying this invention. Special portamento effects whereby a desirable transient may be inserted between tones of two frequencies when a sudden change is made from one frequency to the other are also possible with apparatus provided in accordance with the invention. The invention is useful in providing apparatus for producing a vibrato effect. Vibrato is a complex modulation of sound and may involve frequency, amplitude and waveform modulation of a produced tone.

Tones to which vibrato or portamento effects may be imparted may be produced in the units of a music synthesizer. A music synthesizer is an electronic system including, in part, a plurality of units for controlling the characteristics of the selected tone which are cascaded in a synthesizer channel and which may be controlled in accordance with the coding of a coded record. More than one synthesizer channel may be used to produce notes alternately or overlapping. In addition, the synthesizer channel preferably includes means for connecting in cascade with the other units thereof, a vibrato unit or a portamento unit or both. Whether either a vibrato unit or a portamento unit or both are to be used depends upon the music to be played.

Briefly described, the apparatus provided by the present invention may include, in combination with a music synthesizer channel through which a produced tone is to be passed, a first means for altering the frequency characteristics of the tone in response to a control signal, and frequency control means for generating the control signal and applying the signal to the first means whereby a selected portamento or vibrato note synthesis will be produced.

Accordingly, it is an object of the present invention to provide improved apparatus for controlling changes in characteristics of a tone.

A further object of the invention is to provide improved apparatus for obtaining tonal effects involving changes in pitch.

A still further object of the invention is to provide improved apparatus for obtaining a vibrato effect.

A still further object of the invention is to provide improved apparatus for obtaining a portamento or frequency glide effect.

A still further object of the present invention is to provide a unit to be associated with a music synthesizer channel for obtaining a vibrato effect in the synthesizer output.

A still further object of the present invention is to provide a unit to be associated with a music synthesizer channel for obtaining a portamento or frequency glide effect in the synthesizer output.

Other objects and advantages of the present invention will, of course, become apparent and immediately suggest themselves to those skilled in the art to which the invention is directed from a reading of the following description in connection with the accompanying drawings in which.

Figure 1:
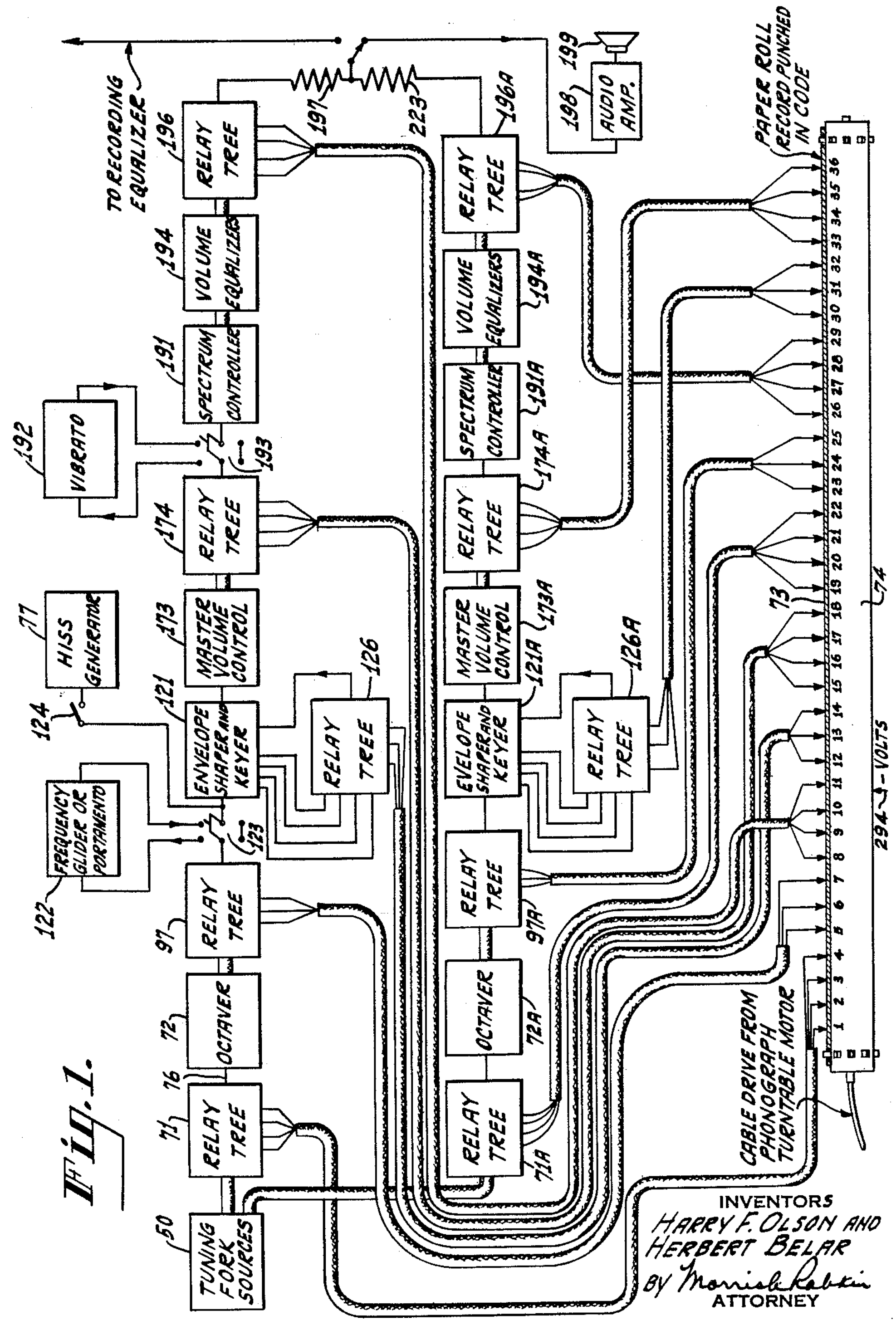
FIG. 1 is a block diagram illustrating parts of a music synthesizer which may incorporate portamento and vibrato units provided by the invention.
Figure 2:
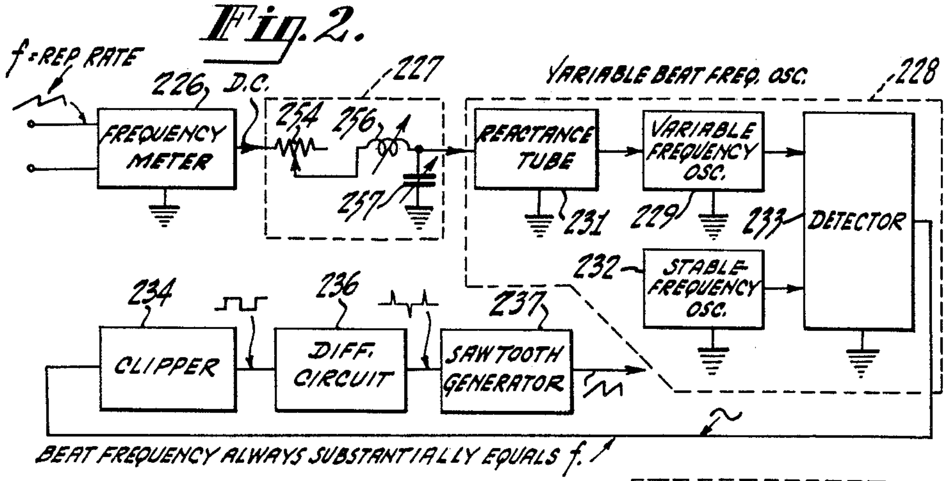
FIG. 2 is a block and circuit diagram of the frequency glider or portamento unit shown in FIG. 1.
Figures 2A, 2B, 2C:
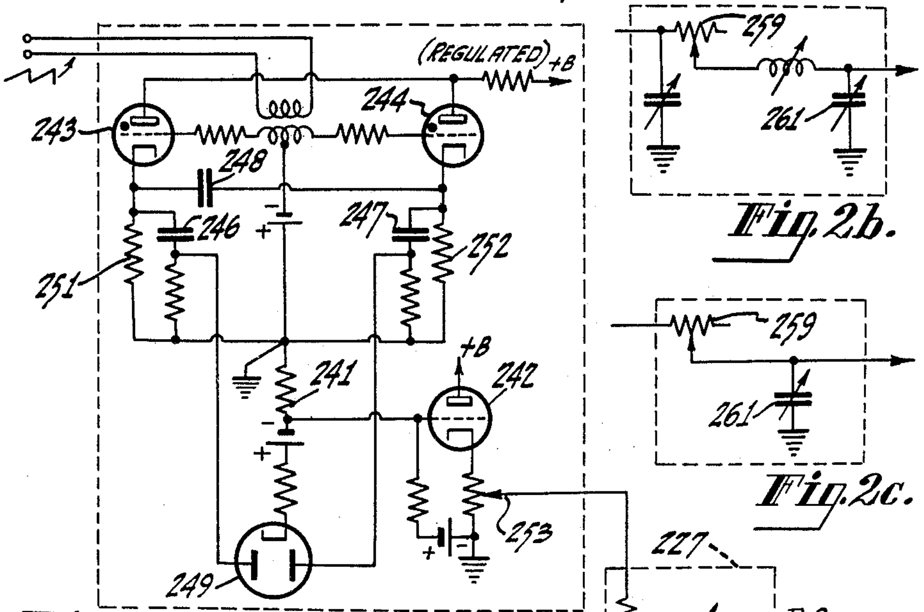
Figure 2D:
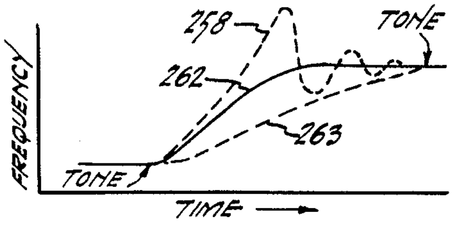
Figure 3:
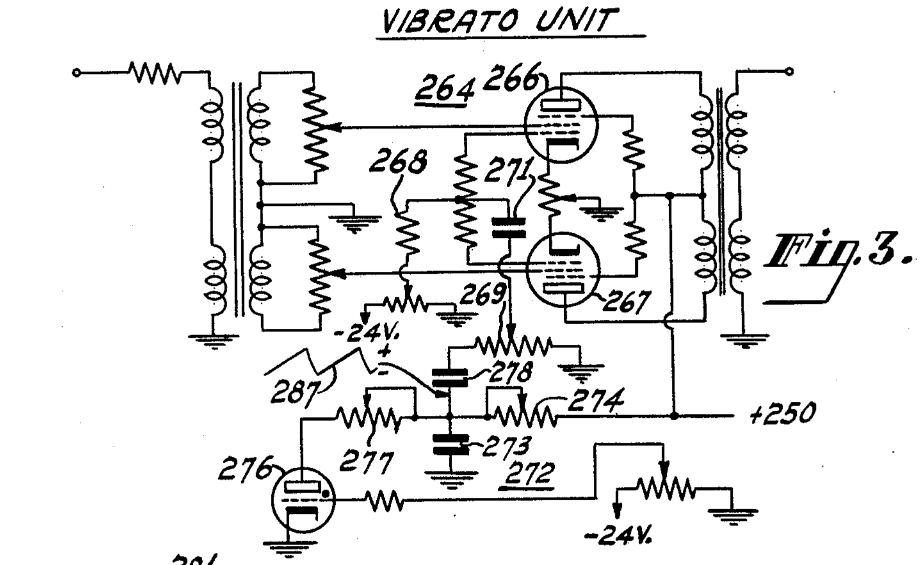

FIG. 2*a* is a circuit diagram of the frequency meter shown in FIG. 2;

FIGS. 2*b* and 2*c* are circuit diagrams of different filters that may be used in the frequency glider unit of FIG. 2;

FIG. 2*d* is a group of graphs that are referred to in explaining the operation of the frequency glider;

FIG. 3 is a circuit diagram of the vibrato unit shown in FIG. 1; and

Figures 3A, 3B:
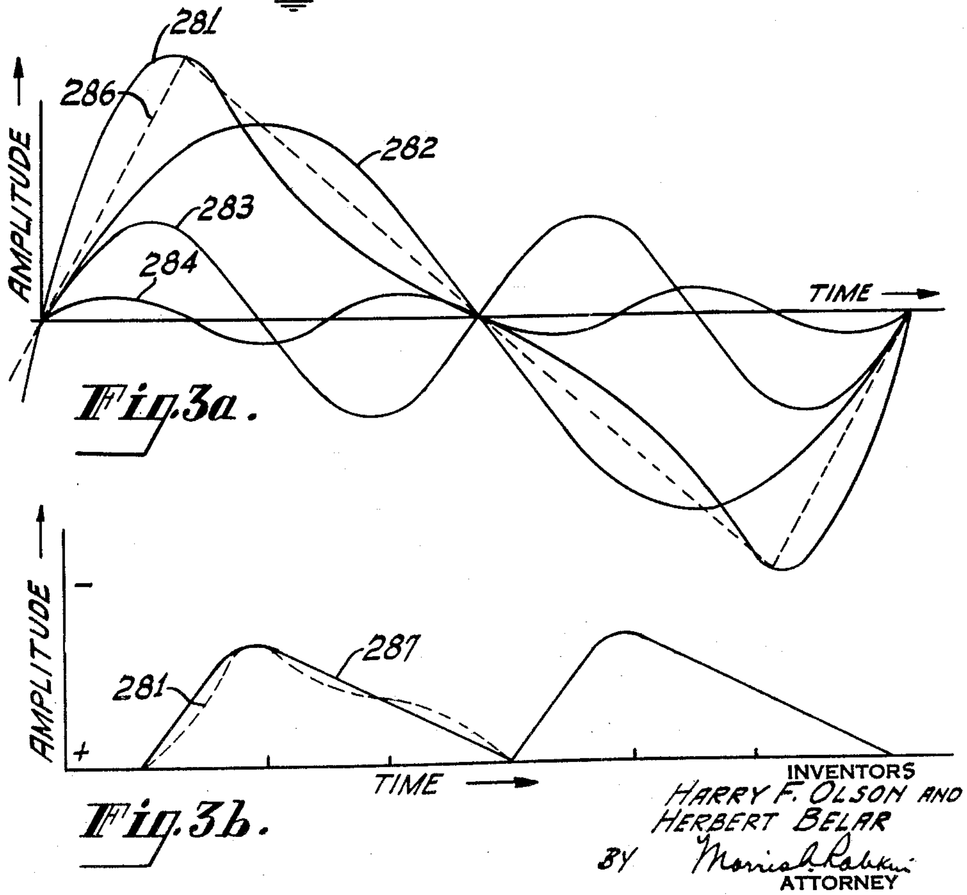

FIGS. 3*a* and 3*b* are graphs that are referred to in explaining the operation of the vibrato unit.

In FIG. 1, signal frequency sources, such as tuning forks, are indicated by the block 50. Twelve fork sources may be used corresponding to the twelve notes in the equally tempered scale. Instead of tuning forks, one may employ tone wheels, oscillators, or any other suitable signal source. A binary relay switching arrangement or relay tree 71 is employed for connecting any desired tune fork source to the input of an octaver 72. By employing a binary switching arrangement in combination with a coded record such as a punched paper roll, it has been possible to reduce very greatly the number of contacts required at the coded record.

A punched paper roll in indicated at 73. This paper roll passes between brushes or contact points numbered 1 to 36, inclusive, and a metal contact and driving roller 74 having sprockets at each end. When a hole in the paper roll falls under a brush, a relay coil is connected to said brush and is energized to pull down the associated relay armatures. From the foregoing, it will be apparent that by means of a four-hole code, it is possible to connect any of the desired one of the tuning fork sources to the octaver 72.

The octaver 72 is a unit for producing a selected note in any desired octave within the range of the synthesizer. By way of example, the octaver may comprise both dividing and multiplying circuits. The octaver might comprise dividers only or multipliers only, particularly if different frequency signal sources are selected. Saw-tooth waves of different frequencies may be obtained at the output terminal of the octaver 72. The output of the octaver is connected to the octaver relay tree 97.

An envelope shaper and keyer unit 121 controls the rise, the duration and the decay of the note or signal passed through the synthesizer channel. It performs a double function; it shapes the signal envelope, and it opens and closes the synthesizer channel. The output of the octaver relay tree 97 may be supplied directly to the envelope shaper and keyer unit 121. Alternatively, the output of the octaver relay tree 97 may be supplied through a frequency glider or portamento 122 by means of the double-pole, double-throw switch 123, when the switch is in the "up" position. The portamento unit and its use will be set forth later herein. When the switch 123 is in the "down" position, there is a direct connection from the octaver relay tree into the envelope shaper and keyer unit.

The shaper and keyer unit 121 may comprise an amplifier and associated biasing or unblocking circuits under the control of the coded paper roll 73. It may be mentioned at this point that in the preferred operation of the synthesizer, the paper roll is coded so that all of the units of the synthesizer channel are set up before the envelope shaper and keyer 121 causes the channel to be unblocked. In this way the appearance of relay-clicks, and the like in the final output is avoided.

The output of the envelope shaper and keyer unit 121 is fed to a master volume control unit 173 which is controlled by a relay tree 174. The relay tree 174 is the same as the relay tree 71 and is controlled by contact points or brushes 15, 16, 17 and 18, associated with the coded paper roll.

The output of the master volume control relay tree 174 is passed through a signal spectrum controller unit 191 which is largely for the purpose of determining the harmonic content of the tone. This is the unit that determines, to a great extent, whether a tone sounds like that of a violin or that of a trumpet, for example.

A vibrato unit 192 is shown. This unit may be connected in cascade with the spectrum controller 191 by means of a double-pole, double-throw switch 193. Normally this would be connected if violin music, for example, were being played. The vibrato unit 192 will be discussed later.

The spectrum controller unit 191 comprises filters and networks of various types that may be selectively connected into the synthesizer channel by suitable means such as switches or cord connections. In the example illustrated, a filter, resonator networks, and compensating networks may be connected in series by means of cord connections. Through this series combination, the output of the master volume control unit is fed through the spectrum controller 191 to a volume equalizer unit 194. There may be other connections to the volume equalizer unit 194. The volume equalizer unit 194 preferably comprises an individual vacuum tube amplifier for each of the input terminals thereof. The volume equalizer unit may have several input terminals. The output volume of each amplifier of the unit 194 is individually adjustable. In this way, any change in volume caused by the insertion of a different filter or network in the spectrum controller 191 may be compensated.

A relay tree 196 is controlled by contact points or brushes 8, 9, 10 and 11, associated with the coded paper roll. By punching proper codes to be passed under brushes 8, 9, 10 and 11, any spectrum controller network combination that has been set up may be connected in cascade with the rest of the synthesizer channel. The output of the relay tree 196 may be connected through an isolating resistor 197 to a recording equalizer network in the event that a record is to be cut, or to an audio frequency amplifier 198 and loudspeaker 199 in the event that the music is to be heard directly from the synthesizer.

Two synthesizer channels are desirably employed so that the coded paper record can set up one channel while the other channel is in operation and producing a tone. Also, so that one channel can start playing a tone before the other channel stops playing the tone.

FIG. 1 shows a second channel which is a duplicate of the one previously described. Everything is duplicated except for the frequency sources of block 50. Each tuning fork output is connected to an input terminal of the relay tree 71 of the first channel and also to a corresponding input terminal of a relay tree 71A of the second channel.

The second synthesizer channel comprises the frequency sources 50 common to the two channels, the relay tree 71A and octaver 72A, a relay tree 97A, an envelope shaper and keyer 121A, a master volume control unit 173A, a relay tree 174A, a spectrum controller 191A, a volume equalizer unit 194A, and a relay tree 196A. The output of the second channel is fed through an isolating resistor 223 to the output terminal. Thus, the outputs of the two channels may be supplied successively or simultaneously to a record cutter or to a loud-speaker. Instead of using the isolating resistors 197 and 223, it may be preferred to employ a combining amplifier (two tubes with a common output) to which the two channel outputs are applied.

The relay trees of the second channel are controlled by contact points or brushes 19 to 36, inclusive, which are associated with the coded paper roll 73. The second channel is controlled by brushes 19 to 36 in the same way that the first channel is controlled by the brushes 1 to 18.

Inspection of FIG. 1 shows that one-half of the paper roll (the left side as viewed in FIG. 1) carries the punched coding for the first channel while the other half of the roll carries the coding for the second channel.

In order to simplify the drawing, the portamento and vibrato units are not shown associated with the second channel. However, it should be understood that ordinarily if such units are connected in the first channel, corresponding units are also connected in the second channel.

The various units of the music synthesizer channels, shown in FIG. 1, as well as means for operating and coding the coded paper rolls 73, are described and their operation explained in our copending application Serial No. 263,252, filed December 26, 1951 for Music Synthesizer of which the present application is a division, now Patent No. 2,855,816, issued October 14, 1958.

As previously mentioned, it may be desirable to include a frequency glider or portamento unit in the synthesizer channel. With this unit it is possible to slide from one note to another as is commonly done in playing a trombone, a violin or a steel guitar.

A frequency glider is represented in FIG. 1 by the block 122 and is shown in some detail in FIG. 2. Additional details are shown in FIGS. 2*a*, 2*b*, and 2*c*.

As shown in FIG. 2, the frequency glider 122 may comprise a frequency meter 226 of the type that has a direct current output. The D.-C. output increases linearly with an increase in the fundamental frequency of the applied sawtooth wave. The D.-C. output preferably is applied through a filter 227 for controlling the rate of rise or the rise characteristic of the D.-C. control signal.

The output of filter 227 is applied to a suitable oscillator 228 whose frequency is a function of the D.-C. control signal. The particular oscillator illustrated is of the beat frequency type comprising a variable frequency oscillator 229 whose frequency is controlled by a reactance tube 231. The D.-C. control signal is applied to this reactance tube. The beat frequency oscillator further comprises a stable frequency oscillator 232 and a detector 233 to which the outputs of oscillators 232 and 229 are applied.

The output of the detector 233 is a sine wave signal having a frequency equal to the difference in the frequencies of oscillators 229 and 232. This is the desired audio frequency.

Since a sawtooth wave, instead of a sine wave, is desired, the detector output is clipped and differentiated by units 234 and 236, respectively. The differentiated pulses are applied to a sawtooth generator 237 where the positive differentiated pulses trigger the generator to produce a sawtooth wave having a fundamental frequency equal to said desired audio frequency.

The beat frequency oscillator may readily be designed so that the frequency of its output is a linear function of the direct current applied to reactance tube 231.

In the example illustrated, the direct current output of meter 226 increases linearly with increase in applied frequency, and the frequency of the beat frequency oscillator increases linearly with increase in direct current applied to the reactance tube.

In operation, when the sawtooth wave at the frequency meter input changes from one frequency to another, the beat frequency oscillator output follows this change and, likewise, changes from said one frequency to said other frequency. This beat frequency oscillator change, however, is comparatively gradual. The rate of change is controlled by the filter 227 as discussed hereinafter.

Suitable frequency meters for the present purpose are well known in the art. One such meter is shown and described on page 958 of Radio Engineer's Handbook, by Terman. A meter of this type is shown in FIG. 2*a* where an output resistor 241 has been substituted for the D.-C. meter, and where a cathode follower tube 242 is used to feed signal from the output resistor 241 to the filter 227.

In FIG. 2*a* the tubes 243 and 244 are gas triodes connected in an inverter circuit that comprises capacitors 246 and 247. These capacitors are alternately charged from the regulated +B supply voltage on the positive and negative halves of the cycle of the applied signal. Each time a gas triode becomes conducting, it extinguishes the other gas triode. Thus, assuming tube 244 is conducting, as soon as tube 243 is made conducting, it puts a short across tube 244 to extinguish it. The shorting connection includes a capacitor 248.

The charging currents of the capacitors 246 and 247 flow through the double diode 249 and through the load resistor 241 as a direct current. Any pulsations in this direct current may be smoothed out by a capacitor (not shown) across the load resistor. Such a capacitor is not provided in the circuit illustrated as sufficient smoothing is provided by the filter 227.

It will be noted that, between charging current pulses, the charges on capacitors 246 and 247 leak off by way of resistors 251 and 252, respectively.

If desired, the sawtooth wave may be applied directly to the frequency meter as indicated in FIG. 2*a*. However, it may be preferred first to clip the sawtooth wave to produce a square wave that is applied to the frequency meter. Or the sawtooth wave may be passed through a bandpass filter to obtain substantially a sine wave that is applied to the frequency meter.

As examples of other suitable frequency meters, reference is made to the audio frequency meter Type No. 306-A manufactured by Radio Corporation of America and also the frequency meter shown on page 571 of the text, Electronics Manual for Radio Engineers, by Vin-Zeluff and John Markus, first edition, published by McGraw-Hill Book Company, Incorporated.

Suitable variable frequency oscillators, such as beat frequency oscillators, are so well known that it is not necessary to describe circuit details. It may be noted that suitable reactance tube circuits for variable frequency oscillators are described in the article by Charles Travis entitled "Automatic Frequency Control," beginning on page 1125 of the October, 1935, issue of the periodical Proceedings of the Institute of Radio Engineers.

In practice, it is generally found that the frequency glider need not have an operating range greater than two octaves. Because of this limited frequency range, there is no difficulty in designing and adjusting the circuit so that the beat frequency oscillator output follows the frequency meter input very closely in frequency.

It may be desirable to provide more than one frequency glider for a music synthesizer channel, one frequency glider to have a range for the trombone, another a range for a violin, et cetera. Only one frequency glider at a time is used. The point is that a two octave range is sufficient for any one musical instrument.

The frequency glider, of course, must be adjusted initially so that its output has the same frequency as that of the glider input signal. This, for the most part, is done by adjustment of the beat frequency oscillator. It may also be done, possibly as a final adjustment, by adjusting a variable tap 253 on the output resistor of the cathode follower tube 242.

The function of the filter 227 will now be described with particular reference to the graphs of FIG. 2*d*. Filter

227 in the form shown in FIG. 2 comprises a variable resistor 254 and a variable inductor 256 in series, and a variable capacitor 257 in shunt. The inductor 256 and capacitor 257 are given such values that they resonate at some low frequency so that the signal applied to the reactance tube 231 overshoots when gliding from one note to another as shown by the graph 258 in FIG. 2*d*.

Since the oscillator output frequency follows the overshoot and the following slow oscillation, also shown by graph 258, the effect is to put a wobble in the tone just before it settles down to a steady tone. This is an effect often found in music. It may occur as a trombone player starts to sound a new note. The same effect is found in singing.

The filter 227 may be made to resonate at about eight cycles per second, for example. In this case the values may be 400 henrys for inductor 256, one microfarad for capacitor 257, and 100 ohms for resistor 254. The 100 ohms includes the resistance of coil 256. The resistor 254 may be adjusted to vary the amount of the overshoot and the duration of the wobble.

As another example, the filter 227 might be adjusted to resonate at 16 cycles per second.

Instead of the filter 227 as shown in FIG. 2, the filter shown in FIG. 2*b* might be used. It comprises a resistor and an inductor in series. It also is tuned to resonate at a low frequency.

In some cases it will be preferred to have no overshoot. In such cases a resistor-capacitor filter such as shown in FIG. 2*c* may be used in place of the filter 227 shown in FIG. 2. This filter comprises a variable series resistor 259 and a variable shunt capacitor 261. Use of this filter will give the result shown by the graph 262 or the graph 263 depending upon the adjustment of the filter. Here the resistor 259 might, for example, have a value of 100,000 ohms and the capacitor 261 a value of one microfarad. This gives a filter time constant of 0.1 second so that it takes about 0.1 second to glide from one note to another.

Vibrato is a term used to designate primarily frequency modulation of a tone. In actual practice, particularly as the sound reaches the ear, it involves frequency and amplitude modulation or waveform modulation or the combination of all three. It is used in singing and in playing certain musical instruments such as the violin and the trombone.

Tremolo, strictly speaking, is a term used to designate amplitude modulation only. Such modulation, if done by a modulating signal having a single frequency, does not give a pleasing effect. It does not sound like a vibrato. For example, if a violin tone is amplitude modulated by a seven cycle per second sine wave signal, the result will not correspond to a vibrato.

We have found, however, that a vibrato effect can be obtained by means of amplitude modulation providing a suitable wave rich in harmonics is used as the modulating wave.

It is well known that a carrier wave that is frequency modulated by a sine wave signal consists of a component at the carrier frequency and of many side band components. It is also true that if a carrier wave is amplitude modulated by a non-sinusoidal signal having many frequency components, the resulting signal consists of a component at the carrier frequency and of many side band components, specifically, a side band component for each modulating frequency component.

The difference between a frequency modulated signal and an amplitude modulated signal having many side bands as above described is in the phase relation of the side bands. The human ear, however, is not sensitive to phase relations. Thus it appears that it should be possible to obtain a true vibrato effect so far as the ear is concerned by means of suitable amplitude modulation. It has been found in practice that this is correct, and that a good vibrato effect can be obtained by amplitude modulating with a sawtooth wave, for example.

FIG. 3 illustrates one suitable circuit for obtaining a vibrato effect in accordance with the present invention. It comprises a balanced amplifier 264 that includes two pentode amplifier tubes 266 and 267. The amplifier circuit itself is conventional and includes a suitable gain control circuit. In the example shown, the input signal is applied to the second grids of the pentodes 266 and 267 while the first grids are used for gain control. Suitable operating bias is applied to the first grids through a resistor 268.

Gain control voltage is applied to the first grids from a resistor 269 through a coupling capacitor 271.

Signal passed through the amplifier 264 is amplitude modulated by a sawtooth wave from a sawtooth generator 272 which may be of any suitable type. In the example shown, generator 272 comprises a capacitor 273 that is charged through an adjustable resistor 274 from a direct current source.

After the capacitor 273 charges up to a certain voltage, a gas tube 276 breaks down. The capacitor 273 then discharges through an adjustable resistor 277 and the gas tube 276. The break-down voltage of the tube 276 may be adjusted by adjusting the negative bias voltage applied to its grid. The charging and discharging rates of capacitor 273 may be adjusted by the resistors 274 and 277, respectively.

The sawtooth wave of generator 272 is applied by way of a coupling capacitor 278 and the resistor 269 to the gain control grids of the amplifier 266 and 267.

Since the modulating sawtooth wave is rich in even and odd harmonics, the desired vibrato effect will be obtained in the vibrato unit output. The quality of the vibrato is determined by the particular sawtooth wave form used. This will be better understood from the following discussion.

Consider the analysis of a 333 cycle per second sine wave that is frequency modulated by a 7 cycle per second sine wave signal with a maximum frequency excursion of a semitone. The resulting modulated signal has the following main components with the relative amplitudes indicated in percentage of the unmodulated carrier amplitude:

333 cycles at 58%
340 cycles and 326 cycles (333±7) at 53%
347 cycles and 319 cycles (333±14) at 22%
354 cycles and 312 cycles (333±21) at 6%

The equivalent amplitude modulated wave (except for phase relation) is a 333 cycle per second carrier wave modulated by the following sine waves with the amplitudes indicated in percentage of the unmodulated carrier amplitude:

7 cycles per second at 106% amplitude
14 cycles per second at 44% amplitude
21 cycles per second at 12% amplitude The resulting modulated wave has the following components:

333 cycles at approximately 100% amplitude
333±7 cycles at 53% amplitude
333±14 cycles at 22% amplitude
333±21 cycles at 6% amplitude The immediately preceding tabulation is strictly correct as to side bands. As to the carrier component, it is not exactly at 100% amplitude because of the overmodulation by the 7 cycle signal. Furthermore, it will be noted that this amplitude of approximately 100% differs substantially from the 58% amplitude of the carrier component in the case of the frequency modulated wave. This difference in carrier component amplitude has been found to be of no apparent importance. From listening tests it appears that the important thing is to have the correct side band components of the correct amplitude.

In FIG. 3*a* the graph 281 shows the wave form of the above-mentioned amplitude modulating wave having the 7 cycle, 14 cycle, and 21 cycle components of substantially the amplitudes tabulated. These 3 components are represented by the graphs 282, 283, and 284, respectively. The amplitudes actually assumed in the graphs are 100%, 50%, and 12.5% for the 7, 14, and 21 cycle components.

It is apparent that the wave form of the signal 281, can be fairly closely approximated by a sawtooth wave, as indicated by the dotted graph 286, where the steeper side of the sawtooth occupies about one-third of the total sawtooth duration.

FIG. 3*b* shows the graph 281 repeated in dotted line and also shows an actual sawtooth wave 287 that has been found in practice to satisfactorily approximate the wave 281. The difference between the sawtooth 287 of FIG. 3*b* and the sawtooth 286 of FIG. 3*a* is that sawtooth 287 bends over somewhat on the steep side. The wave 287 is one that is readily generated by a simple circuit and has been found to be a sufficiently close approximation to a theoretically correct wave shape such as that shown by graph 281.

Referring again to FIG. 3, here the sawtooth wave 287 is drawn in the more usual way with the wave rising upward in the positive direction. As previously indicated, the ratio of the rising portion of the sawtooth to the falling portion of the sawtooth may be adjusted by adjustment of the resistors 274 and 277.

From the foregoing discussion it will be understood that no one particular waveform is required for amplitude modulating the musical tone being passed through amplifier 264 (FIG. 3) to obtain the desired vibrato effect. A waveform such as shown by graph 281 may, of course, be used but the oscillators and adding circuit required to generate it involve considerably more apparatus than is required to generate a sawtooth wave.

The precise ratio of one to two of the steep portion to the gradually sloping portion of the sawtooth wave is not essential although approximately this ratio seems to give the best results. It may be noted that the two extreme limits of a sawtooth have been found to be unsatisfactory. These two limits are: first, a sawtooth wave where the steep portion is substantially vertical instead of sloping; second, a symmetrical triangular wave. The first of these gives a thump each time the steep portion occurs. The second of these does not give the proper sound effect, apparently due to the fact that it does not contain any even harmonic terms.

It should also be pointed out that listening tests show that the amount of modulation by the sawtooth wave to obtain a satisfactory vibrato effect should be substantially less than 100%. This is contrary to what is indicated by the tabulated values previously given where 106% modulation (or approximately 100%) is given for the 7 cycle component. Such 100% modulation of the sawtooth tone wave gives too much sound variation or vibrato effect.

In practice, it has been found that about 50% modulation by the sawtooth tone wave is satisfactory. Stated differently, the 7 cycle, 14 cycle and 21 cycle components modulate the sawtooth carrier wave at about 50% modulation, 22% modulation and 6% modulation, respectively. This value of 50% modulation by the sawtooth wave is not at all critical. In some cases, for example, instead of 50% modulation, it might be preferred to have 25% modulation or 75% modulation.

In the tabulations of side bands for comparing frequency modulation with sawtooth amplitude modulation, it was assumed that the carrier was a sine wave of 333 cycles per second. In the synthesizer, the corresponding carrier that is applied to the vibrato unit amplifier 264 (FIG. 3) is, of course, a sawtooth wave. However, it is believed that the comparison as made assuming a sine wave carrier is accurate, it being remembered that a sawtooth wave actually consists of a fundamental sine wave component and various harmonic sine wave components.

What is claimed is:

1. Apparatus for producing a vibrato effect in a musical tone which comprises a tone generator for generating said musical tone, means for generating a wave of sawtooth type having a periodic frequency equal to that of the desired vibrato rate and having both even and odd harmonic components, and means operatively connected to said generating means and to said tone generator for amplitude modulating said tone by said wave to provide an amplitude modulated tone simulating a tone that is primarily frequency modulated at said vibrato rate.

2. In combination, a tone source for providing a tone, a music synthesizer channel through which said tone is to be passed, said tone source being operatively coupled to said channel, amplitude modulating means connected in cascade in said channel, and means operatively connected to said amplitude modulating means for applying modulating singal of sawtooth wave type to said modulating means such that a mixture of frequency and amplitude modulation of said tone is simulated to produce a vibrato effect.

3. Apparatus for producing a vibrato effect in a musical tone which comprises a musical tone source for providing said tone, an amplitude modulating device through which said tone is to be passed, said tone source being operatively coupled to said device, means for generating an electrical wave of at least approximately sawtooth waveform that has a repetition frequency equal to the desired vibrato rate, and means operatively connecting said generating means to said modulating device for applying said wave to said modulating device to amplitude modulate said tone in accordance with said wave whereby substantially a frequency modulation is simulated.

4. Apparatus for producing a vibrato effect in a musical tone which comprises a tone generator for generating said musical tone, means for producing an electrical wave of sawtooth type and having a certain period, said wave having a portion changing in amplitude in one direction and another portion changing in amplitude in the opposite direction, one of said portions having a duration substantially greater than one-half the period of the wave and substantially less than the full period of the wave, said period being equal to the desired vibrato period, and means operatively connected to said wave producing means and to said tone generator for amplitude modulating said tone by said wave.

5. In a music synthesizer channel, a vibrato unit connected in cascade in said channel and including a tone generator for generating a tone, said unit comprising an amplitude modulating device operatively coupled to said tone generator for amplitude modulating said tone passed therethrough, a generator of an electrical wave of sawtooth type a certain period, said wave having a portion changing in amplitude in one direction and another portion changing in amplitude in the opposite direction, one of said portions having a duration substantially greater than one-half the period of the wave and substantially less than the full period of the wave, said period being equal to the desired vibrato period, and means operatively connecting said wave producing means to said modulating device for applying said wave to said modulating device to amplitude modulate said tone as a function of said wave.

6. In a music synthesizer channel having a tone source for providing a tone, a vibrato unit connected in cascade in said channel, said unit comprising an amplitude modulating device operatively coupled to said tone source for amplitude modulating said tone passed therethrough, a sawtooth generator which provides an electrical wave of a certain period and of at least approximately sawtooth waveform, said sawtooth having a portion changing in amplitude in one direction and another portion changing in amplitude in the opposite direction, one of said sawtooth portions having a duration substantially greater than one-half the period of the sawtooth and substantially less than the full period of the sawtooth, said period being equal to the desired vibrato period, and means operatively connecting said wave producing means to said modulating device for applying said sawtooth wave to said modulating device to amplitude modulate said tone as a function of said sawtooth wave.

References Cited in the file of this patent

UNITED STATES PATENTS

| | | |
|---|---|---|
| 1,957,885 | Grimwood | May 8, 1934 |
| 2,141,231 | Trautwein | Dec. 27, 1938 |
| 2,233,258 | Hammond et al. | Feb. 25, 1941 |
| 2,274,370 | Kent | Feb. 24, 1942 |
| 2,305,864 | Gottier | Dec. 22, 1942 |
| 2,322,884 | Roetken | June 29, 1943 |
| 2,340,001 | McKellep | June 25, 1944 |
| 2,340,002 | McKellep | June 25, 1944 |
| 2,341,649 | Peterson | Feb. 15, 1944 |
| 2,355,287 | Firestone | Aug. 8, 1944 |
| 2,377,326 | Crosby | June 5, 1945 |
| 2,403,664 | Langer | July 9, 1946 |
| 2,406,309 | Zeigler | Aug. 20, 1946 |
| 2,416,078 | Zeigler | Feb. 18, 1947 |
| 2,455,472 | Curl | Dec. 7, 1948 |
| 2,456,763 | Zeigler et al. | Dec. 21, 1948 |
| 2,466,306 | Daniel | Apr. 5, 1949 |
| 2,480,137 | Houghton | Aug. 30, 1949 |
| 2,485,538 | Rowe | Oct. 18, 1949 |
| 2,486,208 | Rienstra | Oct. 25, 1949 |
| 2,509,923 | Hanert | May 30, 1950 |
| 2,680,153 | Boothroyd et al. | June 1, 1954 |
| 2,714,633 | Fine | Aug. 2, 1955 |
| 2,811,069 | Faulkner | Oct. 29, 1957 |
| 2,854,879 | Anderson | Oct. 7, 1958 |